A. DAVIS.
TRACTOR.
APPLICATION FILED AUG. 6, 1920.

1,375,571.

Patented Apr. 19, 1921.
3 SHEETS—SHEET 3.

INVENTOR.
A. Davis
BY
ATTORNEY.

UNITED STATES PATENT OFFICE.

ARTHUR DAVIS, OF LIVINGSTON, ILLINOIS.

TRACTOR.

1,375,571.	Specification of Letters Patent.	Patented Apr. 19, 1921.

Application filed August 6, 1920. Serial No. 401,687.

*To all whom it may concern:*

Be it known that I, ARTHUR DAVIS, a citizen of the United States, residing at Livingston, in the county of Madison and State of Illinois, have invented certain new and useful Improvements in Tractors; and I do hereby declare the following to be a full, clear, and exact description of the invention, such as will enable others skilled in the art to which it appertains to make and use the same.

This invention relates to new and useful improvements in tractors especially adapted for farm purposes, such as plowing, cultivating and general hauling and has for its primary object the provision of a drive means between the power source and the bull or drive wheels which will provide a double reduction drive and is capable of driving both drive wheels in either direction and also may drive either drive wheel independent of the other and in either direction so that turning square corners in either direction on partly plowed field may be made by the tractor which is very desirable when plowing as it obviates moving over plowed ground when making the turn.

Another object of this invention is the provision of a tractor of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1:
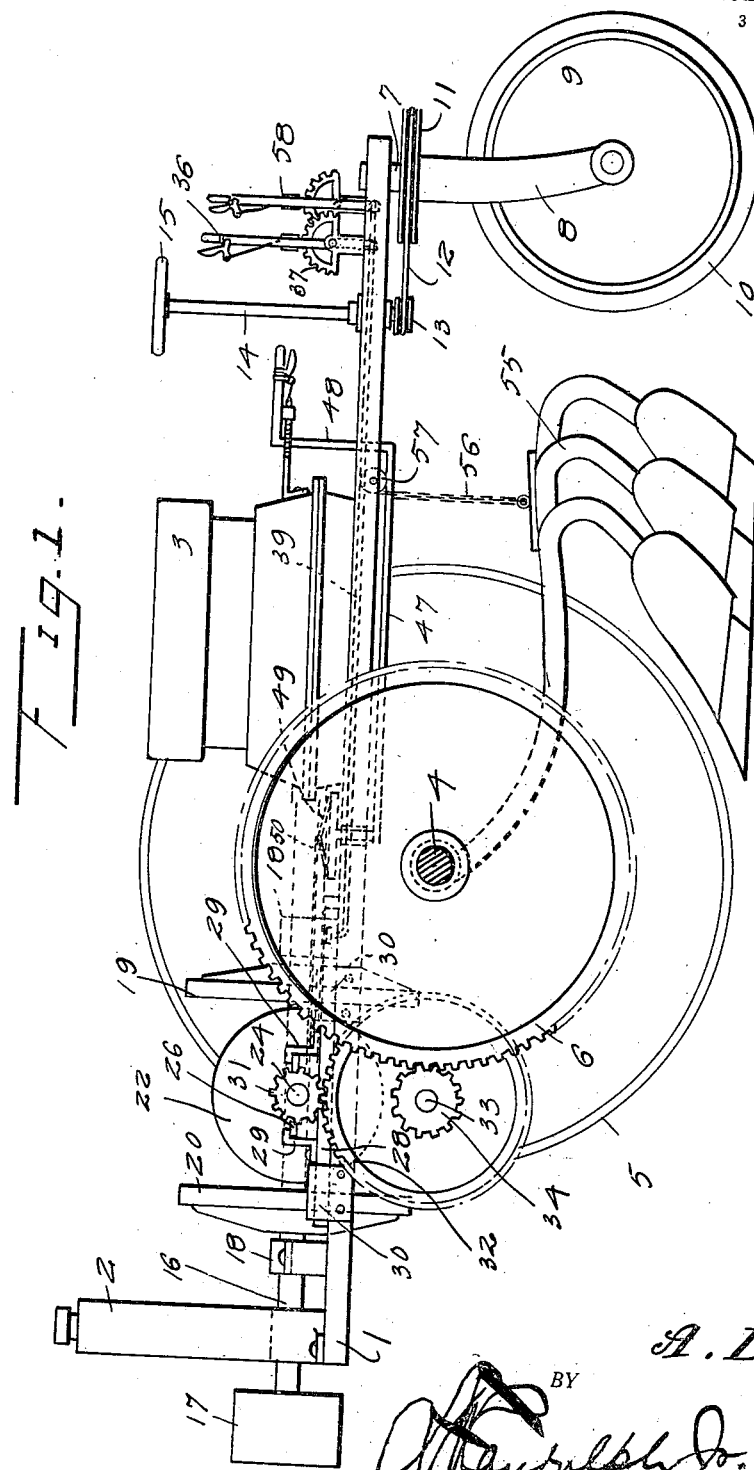
Figure 2:
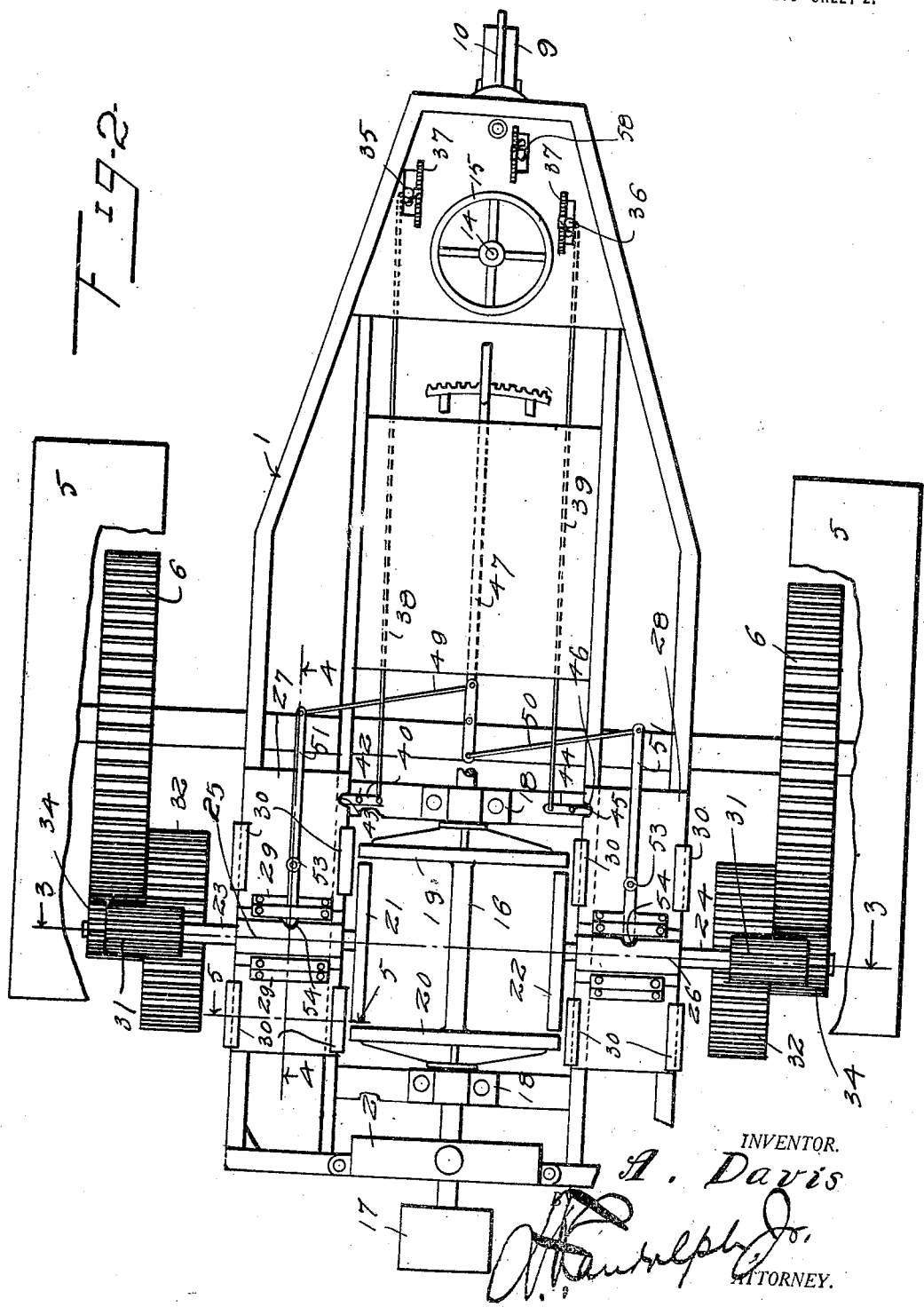
Figure 3:
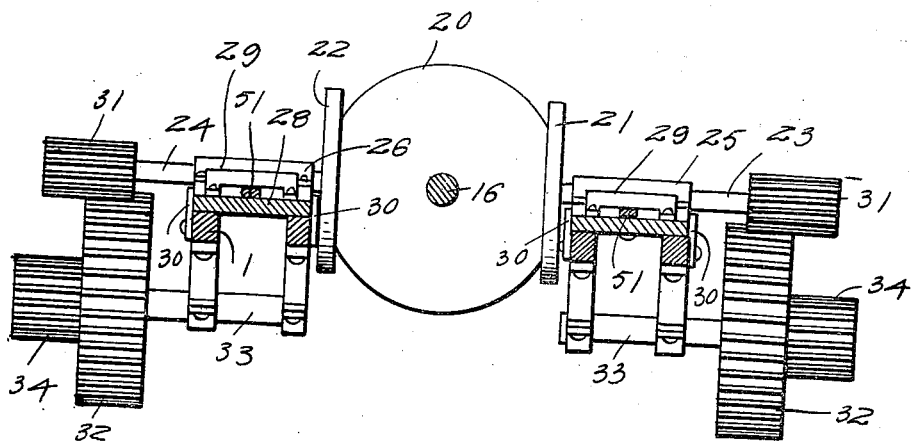
Figure 4:
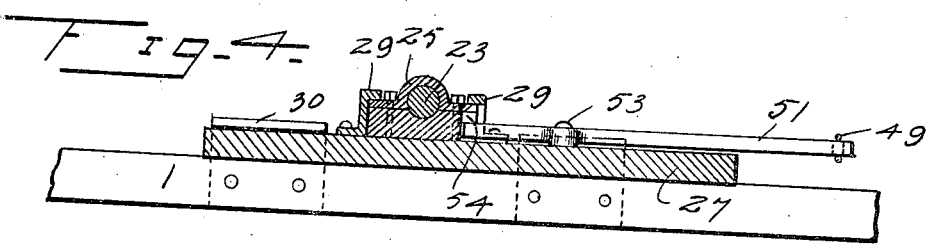
Figure 5:
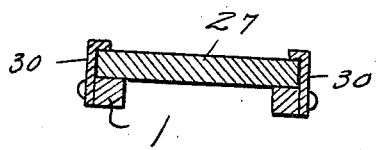

Figure 1 is a side elevation, illustrating a tractor constructed in accordance with my invention, Fig. 2 is a top plan view illustrating the same, Fig. 3 is a transverse sectional view taken on the line 3—3 of Fig. 2, Fig. 4 is a longitudinal sectional view taken on the line 4—4 of Fig. 2, Fig. 5 is a detail transverse sectional view taken on line 5—5 of Fig. 2.

Referring in detail to the drawings, the numeral 1 indicates a base or frame having its rear end reduced while its forward end carries a radiator 2 for cooling an engine 3 mounted on the base or frame at a point intermediate its forward and rearward ends. A transversely extending axle 4 is secured to the base or frame 1 forwardly of the engine 3 and has journaled thereon bull or drive wheels 5 which have secured thereto external gears 6. The rear or reduced end of the base or frame 1 has journaled thereto a steering shank 7 which is bifurcated to form spaced arms 8 between which is journaled a rear steering or pilot wheel 9 having the usual ribbed periphery 10. A steering disk 11 is secured to the shank 7 under the base or frame 1 and has its periphery grooved to receive a cable 12 which is connected to a pulley 13 which is secured to the lower end of a steering rod or column 14. Steering column or post 14 is mounted in the frame or base in any desired manner and is provided with the steering wheel 15 whereby the pilot or steering wheel 9 which supports the rear end of the base or frame may be turned in either direction for the purpose of steering the tractor.

A power shaft 16 is driven by the engine 3 by being connected to its crank shaft in any desired manner and extends forwardly of the frame or base 1 and carries at its forward end a pulley 17 to which a belt or the like may be connected for driving other machinery by the engine. The drive shaft 16 is journaled in suitable bearings 18 carried by the frame or base 1 and has secured thereto spaced disks 19 and 20 adapted to be engaged by disks 21 and 22 which are secured to the inner ends of shafts 23 and 24 respectively. The latter named shafts are journaled in bearings 25 and 26 which are mounted on plates 27 and 28 in such a manner that said bearings are capable of having transverse sliding movement in relation to said plates and the frame or base 1, for the purpose of positioning the disks 21 and 22 at various points in relation to the disks 19 and 20 or in other words providing means whereby the disks 21 and 22 can be moved toward the center of the disks 20 and 19 and also moved toward their peripheries for the purpose of increasing and decreasing the speed of the tractor. The bearings 25 and 26 are slidably mounted in suitable guides 29 carried by the plates 27 and 28 and said plates are mounted for movement longitudinally of the frame or base 1 in either direction by being slidably connected to the base or frame by a guide 30. The plates 27 and 28 mounted for sliding movement in a longitudinal direction permits the disks 21 and 22 to engage either of the disks 19 and 20 for the purpose of reversing the direction of travel of the tractor and also provides means whereby either one of the drive wheels 5 may be driven in either direction. The neutral or normal position of the disks 21 and 22 are spaced from the disks 19 and 20 thus breaking the driving connection between the power shaft 16 and the shafts 23 and 24 permitting the engine to run while the tractor stands still. Comparatively broad gears 31 are secured to the ends of the shafts 23 and 24 and mesh with gears 32 secured to stub shafts 33 journaled to the frame or base 1 in any desired manner. Pinions 34 are secured to the stub shaft and mesh with the external gears 6 carried by the drive wheels 5.

Controlling levers 35 and 36 are pivotally mounted on segmental racks 37 carried by the rear end of the base or frame 1 adjacent the steering wheel and said controlling levers are provided with the usual dogs for engagement with the segmental racks to lock said levers in various positions. A forwardly extending rod 38 is connected to the controlling lever 35 above its pivot, and the rod 39 is connected to the controlling lever 36 below its pivot so that upon moving the controlling levers 35 and 36 in corresponding directions, the rods 38 and 39 will be moved in opposite directions. The rod 38 is pivotally connected to a lever 40 which is pivoted to the frame or base as illustrated at 42 and has its other end received within a notch 43 formed in one edge of the plate 27 providing means whereby upon swinging the controlling lever 35 on its pivot, the plate 27 will be compelled to move longitudinally in relation to the frame or base 1 for engaging and disengaging the disk 21 with the disks 19 and 20. A lever 44 is pivotally mounted as illustrated at 45 and has one end pivotally connected to the forward end of the rod 39 and its other end received within a recess 46 formed in one edge of the plate 28 whereby said plates will be moved longitudinally of the base or frame upon swinging the controlling lever 36 on its pivot.

From the foregoing description it will be apparent that by proper manipulation of the controlling levers 35 and 36, the drive wheels 5 may be both driven in the same direction in either a forward or rearward direction and also one of said wheels may remain idle while the other wheel is being driven in either direction or the wheels 5 may be driven in opposite directions when it is desired to make an extremely sharp turn.

A speed changing lever 47 is pivotally mounted on the frame or base and a portion thereof underlies the engine and has formed upon its end a handle 48 whereby said lever may be swung in either direction. Rods 49 and 50 are pivotally connected to the speed changing lever 47 on opposite sides of its pivotal connection to the body or frame 1 and said rods extend in opposite directions and are pivotally connected to levers 51 and 52 that are pivotally mounted on plates 27 and 28 as shown at 53 and have their other ends disposed within recesses 54 formed in the bearings 25 and 27 whereby upon moving the speed changing lever 47 in one direction the bearings 25 and 26 will be moved in the direction of each other to position the disks 21 and 22 closer to the centers of the disks 19 and 20 and by moving said lever in an opposite direction, the disks 21 and 22 are moved toward the peripheries of the disks 19 and 20 thereby providing means wherein the speed of the tractor may be readily varied. The rods 49 and 50 have play at their connections with the speed shifting lever so as to compensate for the movement of the plates 27 and 28.

A plow gang 55 or any other cultivating implement is pivotally mounted on the front axle 4 and has connected thereto a chain or flexible element 56 adapted to pass over a pulley 57 carried by the base or frame 1 and connected to a controlling lever 58 so that the plows or cultivating implements may be raised and lowered as desired and it is desirable to raise the same when making a turn with the tractor.

While I have shown and described the preferred embodiment of my invention, it will be understood that minor changes in construction, combination, and arrangement of parts may be made without departing from the spirit and scope of the invention as claimed.

Having thus described my invention what I claim is:—

1. A tractor including a frame and a power source, a front axle secured to said frame, drive wheels journaled on said axle, a steering wheel supporting the rear end of the frame, a drive shaft journaled to the frame and connected to the power source, spaced disks secured to said drive shaft, driven shafts mounted on said frame for movement longitudinally and transversely of said frame, disks carried by said driven shafts and positioned between the first named disks, and means connecting the driven shafts to the drive wheels.

2. A tractor including a frame and a power source having a drive shaft, an axle secured to said frame, drive wheels journaled on said axle, a rear steering wheel supporting the rear end of the frame, spaced disks secured to said drive shaft, plates mounted on said frame for sliding movement in a longitudinal direction, bearings slidably mounted on said plates for movement in a transverse direction, driven shafts journaled in said bearings, disks secured to said driven shafts and positioned between the first named disks, and controlling means connected to the bearings and to the plates for moving said plates and bearings longitudinally and transversely in respect to the frame to bring about independent rotation of the driven shaft with relation to each other and simultaneously in relation to each other and to cause a varying of speed between the driven shafts and the drive shaft, and means connecting the driven shaft to the drive wheels.

3. A tractor including a frame and a power source, drive wheels journaled to said frame, a steering wheel for said frame, a drive shaft journaled to said frame and connected to the power source, spaced disks secured to said drive shaft, plates slidably mounted on the frame for movement in a longitudinal direction, bearings slidably mounted on said plates for movement in a transverse direction, driven shafts journaled in said bearings, disks secured to the driven shafts and positioned between the first named disks, means for sliding the bearings transversely to change the speed of the driven shaft from that of the drive shaft, means for sliding the plates longitudinally to change the rotation of the driven shaft and to permit rotation of one driven shaft independent of the other or when the latter remains idle, said last named means also capable of permitting the drive shaft to be driven in opposite directions, and means connecting the driven shafts to the drive wheels.

In testimony whereof I affix my signature in presence of two witnesses.

ARTHUR DAVIS.

Witnesses:
 CARL BLACK,
 WILLIE STONEKING.